US012632694B1

(12) United States Patent
Wallace et al.

(10) Patent No.: US 12,632,694 B1
(45) Date of Patent: May 19, 2026

(54) THREAT-AGNOSTIC NEURAL NETWORK DISCRIMINATOR

(71) Applicant: BAE Systems Information and Electronic Systems Integration Inc., Nashua, NH (US)

(72) Inventors: Jeffrey A. Wallace, Nashua, NH (US); Zachary J. Boll, Nashua, NH (US); Lucas Lawrence-Hurt, Newmarket, NH (US); Michael N. Mercier, Nashua, NH (US); Benjamin P. Wood, Bedford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1528 days.

(21) Appl. No.: 16/151,635

(22) Filed: Oct. 4, 2018

Related U.S. Application Data

(60) Provisional application No. 62/568,027, filed on Oct. 4, 2017.

(51) Int. Cl.
*G06N 3/04* (2023.01)
*G06F 18/214* (2023.01)
(Continued)

(52) U.S. Cl.
CPC ............. *G06N 3/04* (2013.01); *G06F 18/214* (2023.01); *G06F 18/24* (2023.01); *G06N 3/084* (2013.01); *G06N 5/04* (2013.01); *H04L 43/16* (2013.01)

(58) Field of Classification Search
CPC ............ G06N 3/04; G06N 3/084; G06N 5/04; G06K 9/6256; G06K 9/6267
See application file for complete search history.

(56) References Cited

U.S. PATENT DOCUMENTS

| | | | |
|---|---|---|---|
| 6,169,981 B1 | 1/2001 | Werbos | |
| 9,015,093 B1 | 4/2015 | Commons | |
| | (Continued) | | |

OTHER PUBLICATIONS

Chong, Y. S., & Tay, Y. H. (Jan. 2017). Abnormal event detection in videos using spatiotemporal autoencoder. In International symposium on neural networks (pp. 189-196). Springer, Cham. (Year: 2017).*

(Continued)

*Primary Examiner* — Kamran Afshar
*Assistant Examiner* — Lokesha Patel
(74) *Attorney, Agent, or Firm* — Scott J. Asmus; Gary McFaline; Sand, Sebolt & Wernow LPA

(57) ABSTRACT
A neural network discriminator includes a neural network autoencoder and a scorer. The scorer compares an original signal or signature with a reconstructed signal or signature generated in the neural network autoencoder. The scorer generates a similarity score based on the comparison. If the similarity score exceeds a threshold value, then the discriminator determines that the source of the original signal is a positive indicator. In some scenarios, the positive indicator refers to a threat, such as a missile or other enemy object that may cause harm, from an open set of signal signatures that the discriminator has never learned or never been exposed to. The discriminator can also determine clutter signatures from the open set of signature that the discriminator has never been exposed to.

16 Claims, 6 Drawing Sheets

(51) Int. Cl.

| | | |
|---|---|---|
| *G06F 18/24* | (2023.01) | |
| *G06N 3/084* | (2023.01) | |
| *G06N 5/04* | (2023.01) | |
| *H04L 43/16* | (2022.01) | |

(56) References Cited

U.S. PATENT DOCUMENTS

| | | | |
|---|---|---|---|
| 9,053,431 | B1 | 6/2015 | Commons |
| 2005/0179591 | A1* | 8/2005 | Bertoni ................ G01S 5/0215 |
| | | | 342/453 |
| 2015/0219426 | A1* | 8/2015 | Moraites ................... G06T 7/70 |
| | | | 89/1.11 |
| 2016/0155136 | A1* | 6/2016 | Zhang .................. G06N 3/0454 |
| | | | 705/7.29 |
| 2017/0059692 | A1* | 3/2017 | Laufer ...................... G01S 7/38 |
| | | | |
| 2018/0089531 | A1* | 3/2018 | Geva ........................ G06F 3/015 |

OTHER PUBLICATIONS

Ororbia, A. G., Reitter, D., Wu, J., & Giles, C. L. (Sep. 2015). Online learning of deep hybrid architectures for semi-supervised categorization. In Joint European Conference on Machine Learning and Knowledge Discovery in Databases (pp. 516-532). Springer, Cham. (Year: 2015).*

Xu, P., Ye, M., Liu, Q., Li, X., Pei, L., & Ding, J. (Jul. 2014). Motion detection via a couple of auto-encoder networks. In 2014 IEEE International Conference on Multimedia and Expo (ICME) (pp. 1-6). IEEE. (Year: 2014).*

Shepard, R. N. (1962). The analysis of proximities: Multidimensional scaling with an unknown distance function. II. Psychometrika, 27(3), 219-246. (Year: 1962).*

Zhou, C., & Paffenroth, R. C. (Aug. 2017). Anomaly detection with robust deep autoencoders. In Proceedings of the 23rd ACM SIGKDD international conference on knowledge discovery and data mining (pp. 665-674). (Year: 2017).*

Besaw, L. E. (May 2016). Detecting buried explosive hazards with handheld GPR and deep learning. In Detection and Sensing of Mines, Explosive Objects, and Obscured Targets XXI (vol. 9823, p. 98230N). International Society for Optics and Photonics. (Year: 2016).*

Yousefi-Azar, M., Varadharajan, V., Hamey, L., & Tupakula, U. (May 2017). Autoencoder-based feature learning for cyber security applications. In 2017 International joint conference on neural networks (IJCNN) (pp. 3854-3861). IEEE. (Year: 2017).*

Scheirer, "Meta-Recognition: Tools for Improving Recognition Systems", IEEE Transactions on Pattern Analysis and Machine Intelligence, vol. 36, No. 7, Jul. 2013, 2 pages.

Goodfellow et al., "Generative Adversarial Nets", Departement d'informatique et de recherche opérationnelle, Université de Montréal, arXiv:1406.2661v1 [stat.ML], Jun. 10, 2014, pp. 1-9.

Fabius et al., "Variational Recurrent Auto-Encoders", Machine Learning Group, University of Amsterdam, arXiv:1412.6581v6 [stat.ML], Jun. 15, 2015, pp. 1-5.

Larsen et al., "Autoencoding Beyond Pixels Using A Learned Similarity Metric", arXiv:1512.09300v2 [cs.LG], Feb. 10, 2016, 8 pages.

Chollet, "Building Autoencoders in Keras", The Keras Blog, May 14, 2016, 18 pages.

Luc et al., "Semantic Segmentation using Adversarial Networks", Workshop on Adversarial Training, NIPS 2016, Barcelona, Spain, arXiv:1611.08408v1 [cs.CV], Nov. 25, 2016, pp. 1-9 and Supplementary Material pp. 1-3.

Kingma et al., "Adam: A Method For Stochastic Optimization", Published as a conference paper at ICLR 2015, arXiv:1412.6980v9 [cs.LG], Jan. 30, 2017, pp. 1-15.

Pu et al., "Stein Variational Autoencoder", arXiv:1704.05155v1 [cs.LG], Apr. 18, 2017, 18 pages.

Karpathy et al., "Generative Models", <http://openai.com/blog/generative-models/>, retrieved Sep. 20, 2017.

* cited by examiner

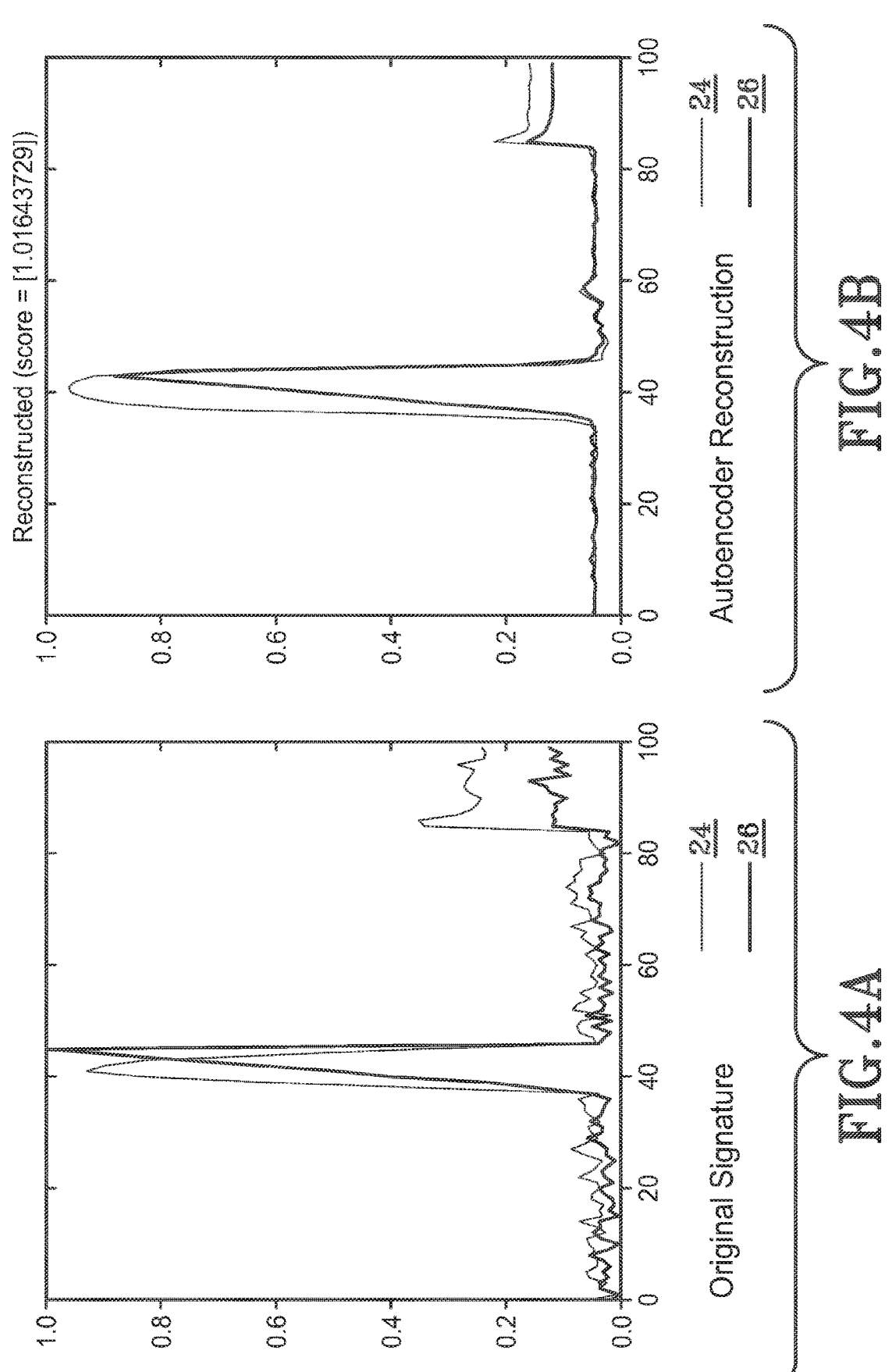

THREAT-AGNOSTIC NEURAL NETWORK DISCRIMINATOR

This application claims the benefit of U.S. Provisional Patent Application No. 62/568,027, filed on Oct. 4, 2017, which is herein incorporated by reference in its entirety.

BACKGROUND

Technical Field

The present disclosure relates generally to neural networks. More particularly, the present disclosure relates to a threat agnostic neural network discriminator.

Background Information

A neural network (NN), in the case of artificial neurons called artificial neural network (ANN) or simulated neural network (SNN), is an interconnected group of artificial neurons that uses a mathematical or computational model for information processing based on a connectionist approach to computation. In most cases an ANN is, in formulation and/or operation, an adaptive system that changes its structure based on external or internal information that flows through the network. Modern neural networks are non-linear statistical data modeling tools. They are usually used to model complex relationships between inputs and outputs or to find patterns in data. In more practical terms neural networks are non-linear statistical data modeling or decision making tools. They can be used to model complex relationships between inputs and outputs or to find patterns in data.

An ANN involves a network of simple processing elements (artificial neurons) which can exhibit complex global behavior, determined by the connections between the processing elements and element parameters. One classical type of artificial neural network is the recurrent Hopfield net. In a neural network model simple nodes, which can be called variously "neurons", "neurodes", "Processing Elements" (PE) or "units", are connected together to form a network of nodes-hence the term "neural network".

Algorithms are used for learning. There are three major learning paradigms, each corresponding to a particular abstract learning task. These are supervised learning, unsupervised learning and reinforcement learning. Usually any given type of network architecture can be employed in any of those tasks. In supervised learning, there are a given a set of examples (for example pairs (x,y), x$\varepsilon$X, y$\varepsilon$Y) and the aim is to find a function $f$ in the allowed class of functions that matches the examples. In other words, the supervised learning algorithm infers how the mapping implied by the data and the cost function is related to the mismatch between the mapping and the data.

In unsupervised learning, there is given data x, and a cost function which is to be minimized which can be any function of x and the network's output, $f$. The cost function is determined by the task formulation. Most applications fall within the domain of estimation problems such as statistical modeling, compression, filtering, blind source separation and clustering.

In reinforcement learning, data x is usually not given, but generated by an agent's interactions with the environment. At each point in time t, the agent performs an action yt and the environment generates an observation xt and an instantaneous cost ct, according to some (usually unknown) dynamics. The aim is to discover a policy for selecting actions that minimizes some measure of a long-term cost, i.e. the expected cumulative cost. The environment's dynamics and the long-term cost for each policy are usually unknown, but can be estimated. ANNs are frequently used in reinforcement learning as part of the overall algorithm. Tasks that fall within the paradigm of reinforcement learning are control problems, games and other sequential decision making tasks.

There are many algorithms for training neural networks; most of them can be viewed as a straightforward application of optimization theory and statistical estimation. They include: Back propagation by gradient descent, Rprop, BFGS, CG etc. Evolutionary computation methods, simulated annealing, expectation maximization, non-parametric methods, particle swarm optimization and other swarm intelligence techniques are among other commonly used methods for training neural networks.

The utility of artificial neural network models lies in the fact that they can be used to infer a function from observations. This is particularly useful in applications where the complexity of the data or task makes the design of such a function by hand impractical.

An open set problem is a problem associated with classifications or groupings by machine-learning techniques. In traditional closed-set machine-learning techniques, a machine-learning device expects one of the inputs is going to be one of the expected outcomes. For example, a common machine-learning example refers to classifying handwritten numerals into computerized/digital representation. The closed-set of possible classes in this instance are the digits zero through nine. A neural network can be trained to identify the handwritten numbers and provide a represented digital output of the number. However, as soon as input that does not correspond to one of the original number sets, such as the letter "A" or another handwritten letter, the neural network is still going to provide an output in an attempt to fit the input to one of the data sets. Traditional neural networks have no mechanism to indicate that there is an input that the device or the neural network has never learned. while traditional machine-learning techniques are well suited for closed set identification, a typical the machine-learned neural network is not very good at producing and matching a predicted outcome from an open set of data types.

SUMMARY

Issues continue to exist with threat discriminators detecting incoming threats. Particularly, a key problem in Missile Warning is threat discrimination that is determining if an extracted signature originates from a threat or clutter which originate from an unknown source. This problem can be further complicated if threat-agnostic discrimination is desired. Stated otherwise, the problem is an open set problem because a determination needs made as to whether a signature originates from a threat that has not been seen before or has never been learned. This present disclosure provides a system, method, and an algorithm which can provide threat-agnostic discrimination. The present disclosure may provide a novel neural network architecture combining supervised and unsupervised learning. The unsupervised portion of the network learns how to measure the features of a threat signature and reconstruct a threat signature from those measurements. The supervised portion of the network learns a feature-based similarity metric between the original and reconstructed signatures to discriminate between threats and clutter. This improves upon existing solutions for several reasons: 1) This architecture allows for threat-agnostic discrimination. Unlike existing solutions (match filters or direct feature measurement), this solution can correctly discriminate new threats that have a combination of features from existing threats. 2) The neural network takes less than 30 minutes to train, allowing for rapid algorithm updates in the event a new threat is identified in theater. 3) The algorithm can be updated with UDM changes only-no code needs to change.

In accordance with one aspect, an exemplary embodiment of the present disclosure may provide a method for threat-agnostic neural network discrimination comprising: reconstructing a signal from latent variables in a neural network autoencoder to generate a reconstructed signal; comparing an original signal with the reconstructed signal in a scorer to generate a signal similarity metric between the original signature and the reconstructed signature; and determining an object type from the signal source based, at least in part, on whether the signal similarity score exceeds a threshold value; and recording the object type, at least temporarily, in a storage medium. This exemplary embodiment or another exemplary embodiment may further provide wherein exceeding the threshold value corresponds to a positive indicator and failing to meet the threshold value corresponds to a negative indicator. This exemplary embodiment or another exemplary embodiment may further provide wherein the positive indicator is a threat and the negative indicator is a non-threat. This exemplary embodiment or another exemplary embodiment may further provide identifying the object type from an open set of signal signatures representing random clutter. This exemplary embodiment or another exemplary embodiment may further provide identifying whether the original signal represents a threat or clutter; and generating a value in the scorer based on whether the original signal represents the threat or clutter. This exemplary embodiment or another exemplary embodiment may further provide determining, in the scorer, a similarity score of the original signature to the reconstructed signature. This exemplary embodiment or another exemplary embodiment may further provide establishing a threshold value of the similarity score, wherein if the similarity score is above the threshold value, then the scorer determines that the original signature was generated from a source intended to be identified, and wherein if the similarity score is below the threshold value, then the scorer determines that the original signature was generated from a clutter source. This exemplary embodiment or another exemplary embodiment may further provide wherein the threshold value is static and established prior to determining the similarity score. This exemplary embodiment or another exemplary embodiment may further provide wherein the threshold value is dynamic and is changed in response to external variables. This exemplary embodiment or another exemplary embodiment may further provide determining a source type of the original signature based on the threshold value; providing the source type to a secondary system; and effecting the secondary system to eliminate the source of the original signature in response to providing the source type to the secondary system.

In accordance with another aspect of the present disclosure, an exemplary embodiment may provide a method for a discriminator comprising: inputting a first signal to a neural network autoencoder and a neural network scorer; compressing the first signal in the neural network autoencoder; generating a set of latent variables in the neural network autoencoder; decoding/reconstructing the first signal from the set of latent variables to generate a reconstructed signal; providing the reconstructed signal to the scorer; and comparing, in the scorer, the reconstructed signal and the first signal. This exemplary embodiment or another exemplary embodiment may further provide training the neural network autoencoder with a set of clean signals substantially free from clutter. This exemplary embodiment or another exemplary embodiment may further provide freezing the parameters of the neural network autoencoder. This exemplary embodiment or another exemplary embodiment may further provide back propagating signals from the scorer to the neural network autoencoder.

In yet another aspect, an exemplary embodiment of the present disclosure may provide a threat-agnostic neural network discriminator comprising: an neural network autoencoder; a neural network scorer connected to the auto-encoder, wherein the scorer compares an original signal with a reconstructed signal generated by the auto-encoder to determine a threat-agnostic discriminative determination from the comparison. This exemplary embodiment or another exemplary embodiment may further provide wherein the auto-encoder comprises: an encoder receiving the original signal, wherein the encoder compresses the original signal down to latent variables (which may be measured); and a decoder/generator to decompress and reconstruct the latent variables and generate a reconstructed signal, and wherein the scorer compares the reconstructed signal against the original signal to determine similarities therebetween. This exemplary embodiment or another exemplary embodiment may further provide a scorer including similarity score values between about 0 and about 1, wherein a score near 0 corresponds to a dissimilarity between the original signal and the reconstructed signal, and a score near 1 corresponds to a similarity between the original signal and the reconstructed signal. This exemplary embodiment or another exemplary embodiment may further provide wherein the original signal corresponds to one of a threat or clutter. This exemplary embodiment or another exemplary embodiment may further provide logic in the scorer including instructions to determine whether the threat signature originates from one of a known threat signature or an unknown threat signature; wherein the discriminator is carried by an airborne platform selected from the group comprising a helicopter, a winged aircraft, and an unmanned aerial vehicle.

In yet another aspect of the present disclosure, an embodiment may provide a neural network discriminator that includes a neural network autoencoder and a neural network scorer. The scorer compares an original signal or signature with a reconstructed signal or signature generated in the neural network autoencoder. The scorer generates a similarity score based on the comparison. If the similarity score exceeds a threshold value, then the discriminator determines that the source of the original signal is a positive indicator. In some scenarios, the positive indicator refers to a threat, such as a missile or other enemy object that may cause harm, from an open set of signal signatures that the discriminator has never learned or never been exposed to. The discriminator can also determine clutter signatures from the open set of signature that the discriminator has never been exposed to.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 4A (FIG. 4A) is a graph of an original signal signature input into the autoencoder.

FIG. 4B (FIG. 4B) is a graph of a reconstructed signal signature output from the autoencoder indicating a strong similarity score or metric as compared to the signal of FIG. 4A.

Similar numbers refer to similar parts throughout the drawings.

DETAILED DESCRIPTION

In accordance with one aspect of the present disclosure, a threat-agnostic neural network discriminator 10 addresses an open set problem which is common to neural networks. The discriminator 10 of the present disclosure mitigates the open set problem for neural network architectures by training or providing a data set of information that is known and a set of unknown information. The discriminator of the present disclosure determines, given a random input signal, whether the input signal is part of the known set of data signatures or is part of the unknown set of data signatures. The discriminator network architecture of the present disclosure mitigates the open set problem by combining an autoencoder and a scorer to cooperate together so as to identify input data that is unable to be matched with a given data set or closed inputs.

Figure 1:
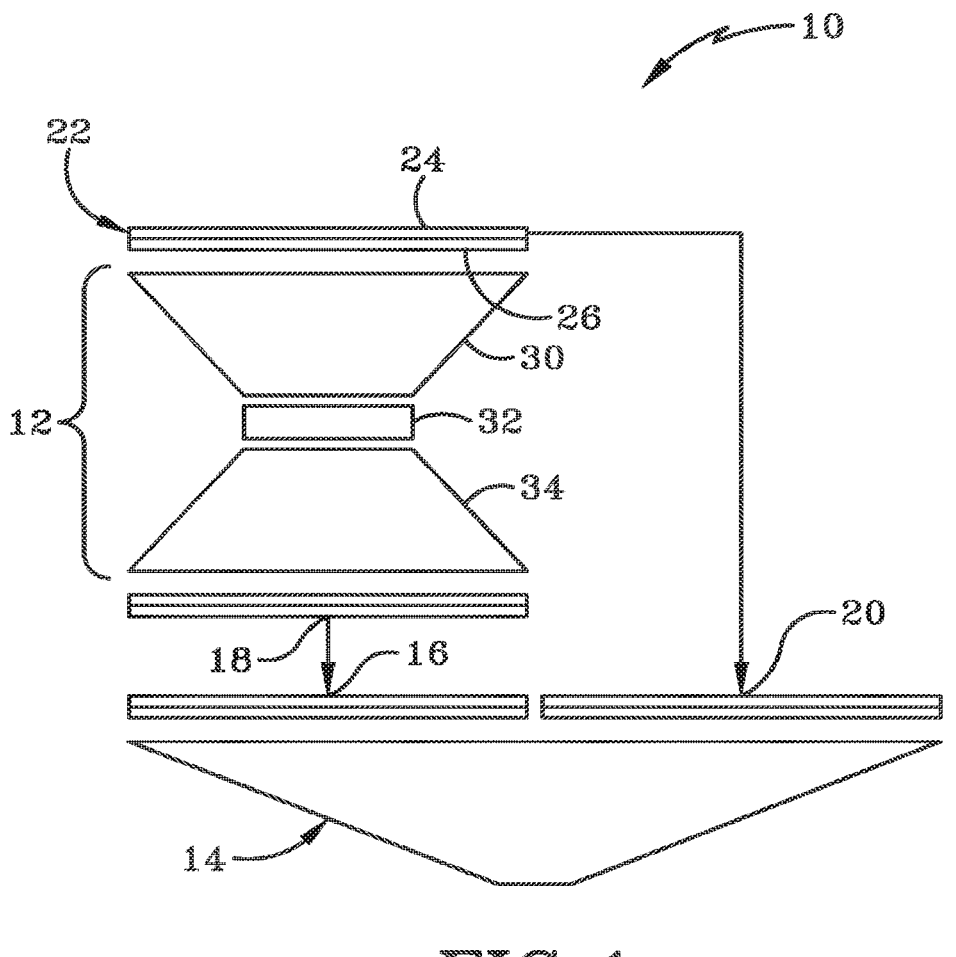
FIG. 1 (FIG. 1) is a schematic view of a threat-agnostic neural network discriminator in accordance with the present disclosure.

FIG. 1 depicts a neural network discriminator 10 that includes a neural network autoencoder 12 and a neural network scorer 14. The scorer 14 includes two inputs. The first input 16 on the scorer 14 is in electrical communication with an output 18 of the autoencoder 12 to receive a reconstructed signal output from autoencoder 12. A second input 20 on the scorer 14 is connected with the input 22 to the discriminator 10 so as to receive a source signal which acts as a reference signal in the scorer 14.

An exemplary autoencoder 12 is an unsupervised framework to learn (typically) low dimensional features from complex data. One type of autoencoder is a variational autoencoder (VAE), which generalizes the original autoencoder in several ways. The VAE encodes input data to a distribution of codes (latent features). Further, the VAE decoder is a generative model, specifying a probabilistic representation of the data via a likelihood function. Another advantage of the VAE is that it yields efficient estimation of the often intractable latent-feature posterior via an approximate model. As a result, the encoder yields efficient inference of the latent features of the generative model (decoder), which is critical for fast computation at test time. The VAE is a powerful framework for unsupervised learning. Additionally, when given labels on a subset of data, a classifier may be associated with the latent features, allowing for semi-supervised learning. VAEs are typically trained by maximizing a variational lower bound of the data log-likelihood. This lower bound is maximized by alternating between optimizing the parameters of the recognition model (encoder) and the parameters of the generative model (decoder). For evaluation of the variational expression, being able to sample efficiently from the encoder is not sufficient; one must be able to explicitly evaluate the associated distribution of latent features.

The input signal provided at input 22 to the discriminator 10 network is generated by an algorithm that finds points of interest in a video or imagery. The algorithm extracts an intensity verse time signature from a local area within that video or image. The algorithm looks for a subframe in the video file to extract intensity signatures therefrom. For each subframe, the intensity signature is represented by a single value. The intensity signature is represented in two color channels. In one example, the color channels are represented as a red channel 24 and a blue channel 26. The two channels 24, 26 represent different color bands of the infrared spectrum. For each of the bands, the algorithm extracts an intensity verse time signature value. Collectively, the two channels 24, 26 represent the input signal. Algorithms that extract the intensity verse time signature in the input signal look for contrast between a point source and the background in the video files or the imagery files. Respectively, the intensity measurement corresponds to the brightness of the point source relative to the background. The two channel 24, 26 of signals are observing the same spot or the same frames in the video imagery; however, they are picking out different information based on the band within which the channel operates. Thus, the selection of algorithm to determine the intensity verse time signature for each channel 24, 26 runs independently from the other channel. Two intensity verse time signals are provided. Collectively, the two intensity verse time signals represent the signal input. Input signal comprised of the two channels of information is provided to the neural network autoencoder 12 at an autoencoder input 28 and to the scorer 14 at input 20. In one particular embodiment, the input signal having two-channel 24, 26 (Red+Blue) defining an Intensity v Time signal(S) is 1 second in length, sampled at 100 Hz (i.e. comprises of 100 time points). The output signal 36, which is referred to as a reconstructed signal, from the autoencoder 12 is a reconstructed Two-Channel (Red+Blue) Intensity v Time signal (S') that is 1 second in length, 100 Hz (i.e. comprising of 100 time points).

The autoencoder 12 includes an encoder 30, latent variables 32, and a decoder or generator 34. The encoder is in electrical communication with the latent variables 32 and in electrical communication with the generator 34.

The scorer 14 is a neural network to compare a reconstructed signal from the autoencoder output 18 (input into the scorer 13 at input 16) with the original input signal 22 (input into scorer 14 at input 20). The manner in which the scorer computes the correlation between the original input signal and the reconstructed signal is a distance function. The scorer learns the distance function during the training process. Discriminator 10 does not provide any constraints as to how the scorer learns to compare the value of the reconstructed signal with the original input signal. The distance comparison function determines whether or not the reconstructed signal is similar to the original signal. Stated otherwise, the scorer determines whether the two signals are the similar enough to either represent a positive indicator or dissimilar so as to represent a negative indicator. In this disclosure, a positive indicator is a threat signature, such as missile, and the negative indicator is a non-threat. However, it is to be understood that the discriminator 10 may be applied to a wide number of neural networks needing to solve open set problem parameters. Prior to operation of the discriminator 10, the autoencoder 12 and scorer 14 must be trained.

Figure 2:
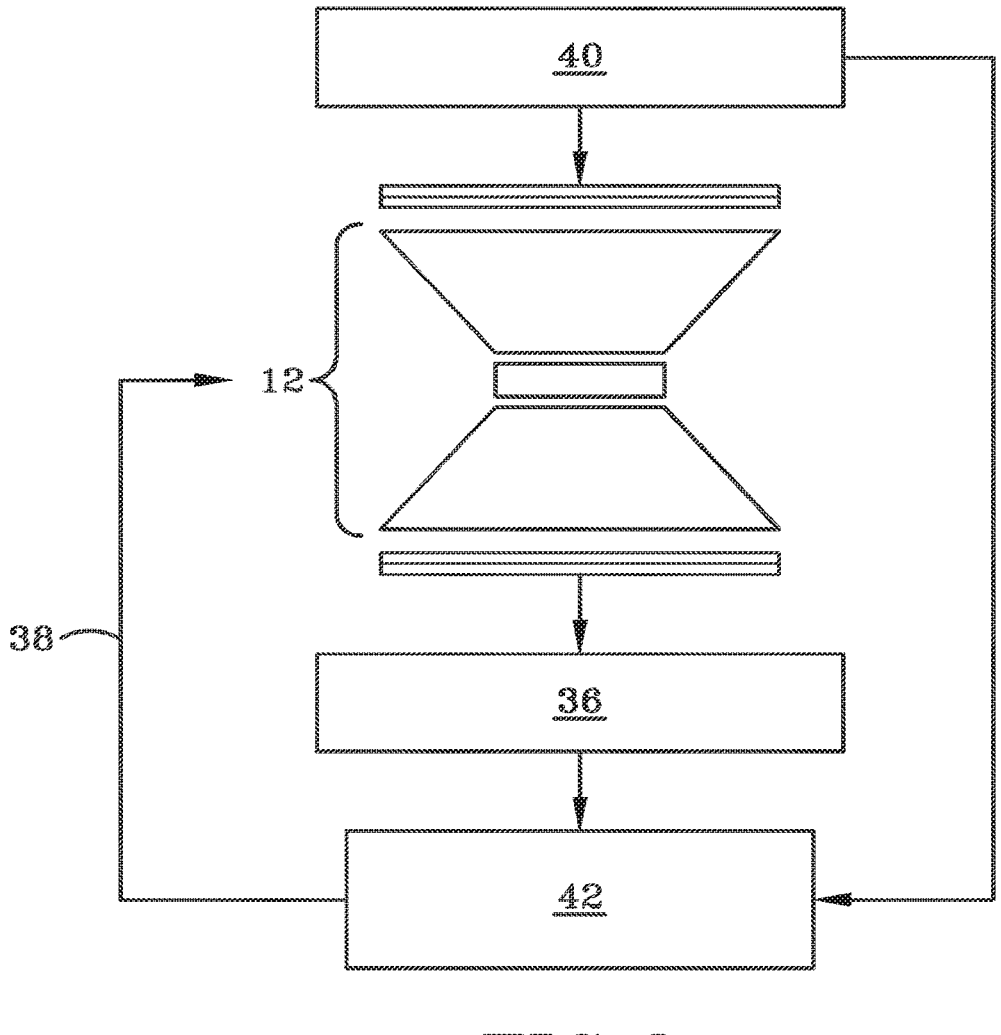
FIG. 2 (FIG. 2) is a schematic view of a first phase of training a neural network autoencoder in the discriminator.
Figure 3:
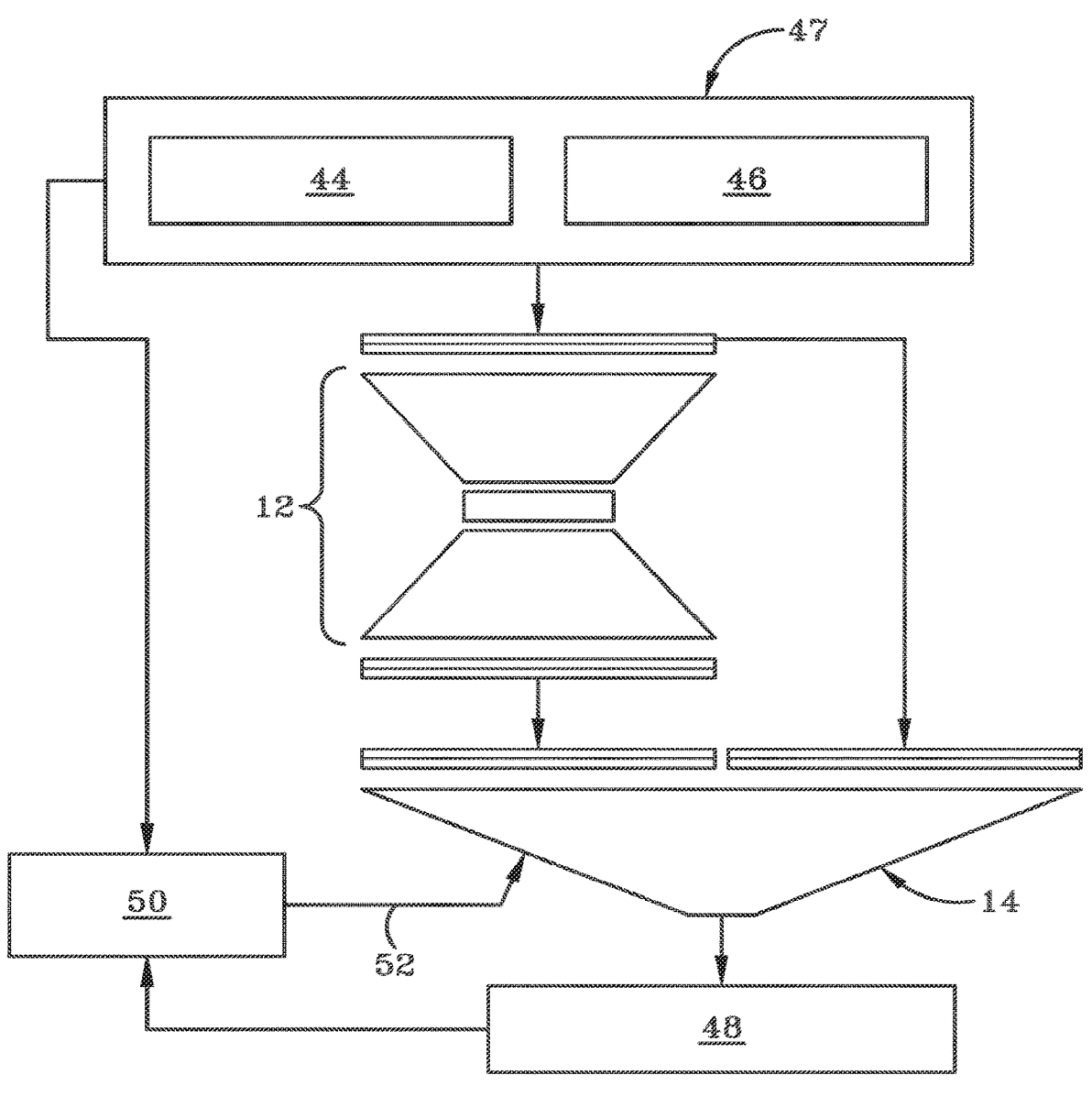
FIG. 3 (FIG. 3) is schematic view of a second phase of training the neural network autoencoder and a scorer in the discriminator.

FIG. 2 and FIG. 3 depict aspect of training the autoencoder 12. When the autoencoder 12 is training, the autoencoder 12 learns how to reconstruct signals (in generator 34) from a compressed representation thereof (compressed via the encoder 30). The autoencoder 12 learns what the important features are in the input signal and how to compress the input signals into a smaller format. Stated otherwise, the encoder 30 is compressing the input signals. The encoder measures the feature sets in the input signal in a learned way. More particularly, the encoder 30 compresses the signal to enable the autoencoder 12 to learn feature sets to detect during signal discrimination. The learning or training of the autoencoder 12 is accomplished by back propagation. In one particular embodiment, the autoencoder 12 is trained independently from the scorer 14.

During training, the input signals are sent into the autoencoder and then output signals are back propagated to the autoencoder 12, shown generally at 38. The back propagated signals are evaluated. A computation, which may also be referred to as an error function or an objective function, is performed to determine how different the output or reconstructed signal is from the input signal. Based on the differences between the input signal and the reconstructed signal, a gradient descent through the parameters of the autoencoder enables the autoencoder to correct itself to compute an output that is closer to the input signal.

The objective function 42 is a combination of the reconstruction loss and the Kullback-Leibler Divergence. The reconstruction loss (RL) quantifies how different the reconstructed signal is from the original signal.

There are many reconstruction loss functions that may be implemented. In accordance with one particular embodiment, the present disclosure utilizes the mean binary cross-entropy equation as it empirically gives the best results.

$$ R_L = \frac{\sum_{i=1}^{N} \ln\left(\frac{S_i'}{1 - S_i'}\right) * S_i + \ln\left(1 + \frac{1 - S_i'}{S'}\right)}{N} $$

The KL Divergence ($KL_L$) function enforces a 'good' distribution of the latent variables 32. The latent variables are forced to be parameters of a Gaussian distribution; i.e. each latent variable is a pair ($\mu_i$, log $\sigma_i$), where $\mu_i$ is the mean of the i-th variable and log $\sigma_i$ is the log of the standard deviation of the i-th variable. The first layer of the decoder consists of k points sampled from this distribution, where k is the number of latent variables.

$$ KL_L = \sum_{i=1}^{k} 1 + \log \sigma_i - \mu_i^2 - \sigma_i $$

The overall objective function (L) is a weighted sum of these functions:

$$ L = aR_L + bKL_L $$

The network learns how to measure latent variables. They are not fixed after training. In one embodiment, the input signal is represented by 2×100 numbers (200 numbers total; 100 per channel). Thus, the encoder portion of the autoencoder learns how to compress the 200 total values down to X number of latent variables. In one particular embodiment, the number of latent variables is 10. Thus, the autoencoder compresses the 200 numerical input numbers down to ten values. From those ten values, the autoencoder 12 reconstructs a 200 number set. The expanded portion expands the latent variables into a reconstructed signal (of 200 values, or however many values were provided in the original input signal) in order to compare the reconstructed signal with the original input signal. The number of latent variables 32 that get distilled down can be any number and depends on the architecture and optimization of the autoencoder 12. While the present disclosure made reference above with respect to ten latent variables, it should be understood that any number of latent variables may be utilized as one having ordinary skill in the art would understand. The reconstructed signal 36 output from the autoencoder 12 still forms two channels that are output to the scorer 14.

The parameters of the autoencoder 12 are optimized with a RMSProp algorithm for optimizing the autoencoder parameters ($\theta$). For each training step, t:

$$ \theta_{t+1} = \theta_t - \frac{\eta}{\sqrt{E[g^2]_t + \epsilon}} g_t $$

Where $\eta$ is the learning rate, $g_t = \nabla L(\theta_t)$ is the gradient of the objective function with respect to the network parameters, e is a smoothing term that prevents division by zero, and $$ E[g^2]_t = \gamma E[g^2]_{t-1} + (1 - \gamma)g_t^2 $$

is the running average of the gradient.

With continued reference to FIG. 2 and FIG. 3, the training process is considered a two-stage process, wherein FIG. 2 depicts the first phase of training the autoencoder and FIG. 3 depicts the second phase of training the autoencoder.

In the first phase of training (FIG. 2), the autoencoder 12 is trained independently. A set of clean training signals (representing a threat) 40 trains the autoencoder 12 to learn how to reconstruct the clean training signals (i.e., threat signatures). Clean training signals used during the first phase of training refers to signals having a high signal to noise ratio (SNR). The reason for training with high SNR signals is because it is undesirable for the autoencoder 12 to learn noise as a feature to be identified during operation. Once the reconstructed signals are output using the high SNR clean training signals, an objective function 42 is executed. The objective function(s) 42 are effectively error functions to compare reconstructed signals with a reference signal of the original input high SNR training signals. The objective function(s) 42 determine how close the original clean training signal is to the reconstructed signal. The error result from the objective function 42 is back propagated through a back propagation technique 38 into the autoencoder 12. The autoencoder 12 adjusts itself based on the back propagation 38 to determine how a second clean training signal should be reconstructed.

After the first phase of training, the parameters of the autoencoder are frozen, or otherwise fixed and remain static. The autoencoder 12 knows to freeze the parameters when it is sufficiently trained by training for a certain amount of time and a certain amount of data. Typically, the autoencoder trains on a number of training signatures on the order of hundreds of thousands.

The second phase of the autoencoder training process (FIG. 3) occurs with the learned portions from the back propagation in stage one (FIG. 2) are frozen and remain static. Effectively, the autoencoder 12 is not trained any further given that the network parameters are frozen or remain static and fixed. Then, a second training set is input into the autoencoder. The second training set may be one of two types 47. The first type is clean signals plus noise 44 (i.e., threat signatures) and the second type is other random clutter signatures 46 that can represent any other type of signal that the autoencoder may encounter. Typically, the clutter signatures 46 represent feature signals that the auto-encoder never encountered during training.

With respect to the open set problem that the discriminator 10 of the present disclosure helps mitigate, the clutter signatures 46 represent the "open set" of problems as a non-threat. The threat signatures 44 represent as a threat. Thus, the discriminator 10 is able to detect threats when the treat signature 44 is input into the autoencoder 12 and also be able to identify an open set of non-threats representing random clutter when the clutter signatures 46 are input into the autoencoder 12. The scorer 14 is trained during the second phase (FIG. 3) to identify that if a threat signature 44 is processed through the autoencoder 12, then scorer 14 will represent the threat in a binary manner such as identifying the threat as the number one (1). If clutter (from clutter signature 46) is sent through the autoencoder 12, then the scorer 14 recognizes its signal/signature as clutter which is not a threat and will provide a binary number of zero (0).

During the second phase of training, the output of the scorer 14 will identify the two signals and compare them and identify whether the original signal was a threat or clutter via similarity metric 48. The scorer 14 compares the signals via a learned distance function. During the training of the scorer 14, the result of the distance function (i.e., similarity metric 48) is then sent to an objective function 50 for mean squared error analysis. The objective function 50 compares the similarity metric to the category label (i.e., threat or clutter) that is provided to the discriminator during the training process and based on how far away the similarity metric was from the answer, the scorer 14 is adjusted via back propagation 52 so as to get closer to be able to compute the correct answer.

After the first and second phases of training has been completed, some processing of the data is performed for sending the collected data to the discriminator 10. More particularly, a processor implements and executes instructions, which may be stored in a storage medium, to perform operations to process raw imagery files. The operations determine whether an object or a source identified in the imagery files should be evaluated by the discriminator. One process may perform a non-uniformity correction. Another process refers to spectral computations to determine whether the signal source should be evaluated by the discriminator 10. A clustering algorithm clusters the detected images in groups that may need to be evaluated by the discriminator 10. Stated otherwise, the clustering algorithm clusters and finds points of interest in a single image. A tracking algorithm performs operations to associate those points of interest over time. Processing algorithms identified above are forwarded to a look-back buffer that is a buffer of imagery or a history of imagery for a certain period of time. Pixel regions retained in the look-back buffer are the data imagery that is sent to the discriminator 10.

Figures 5A, 5B:
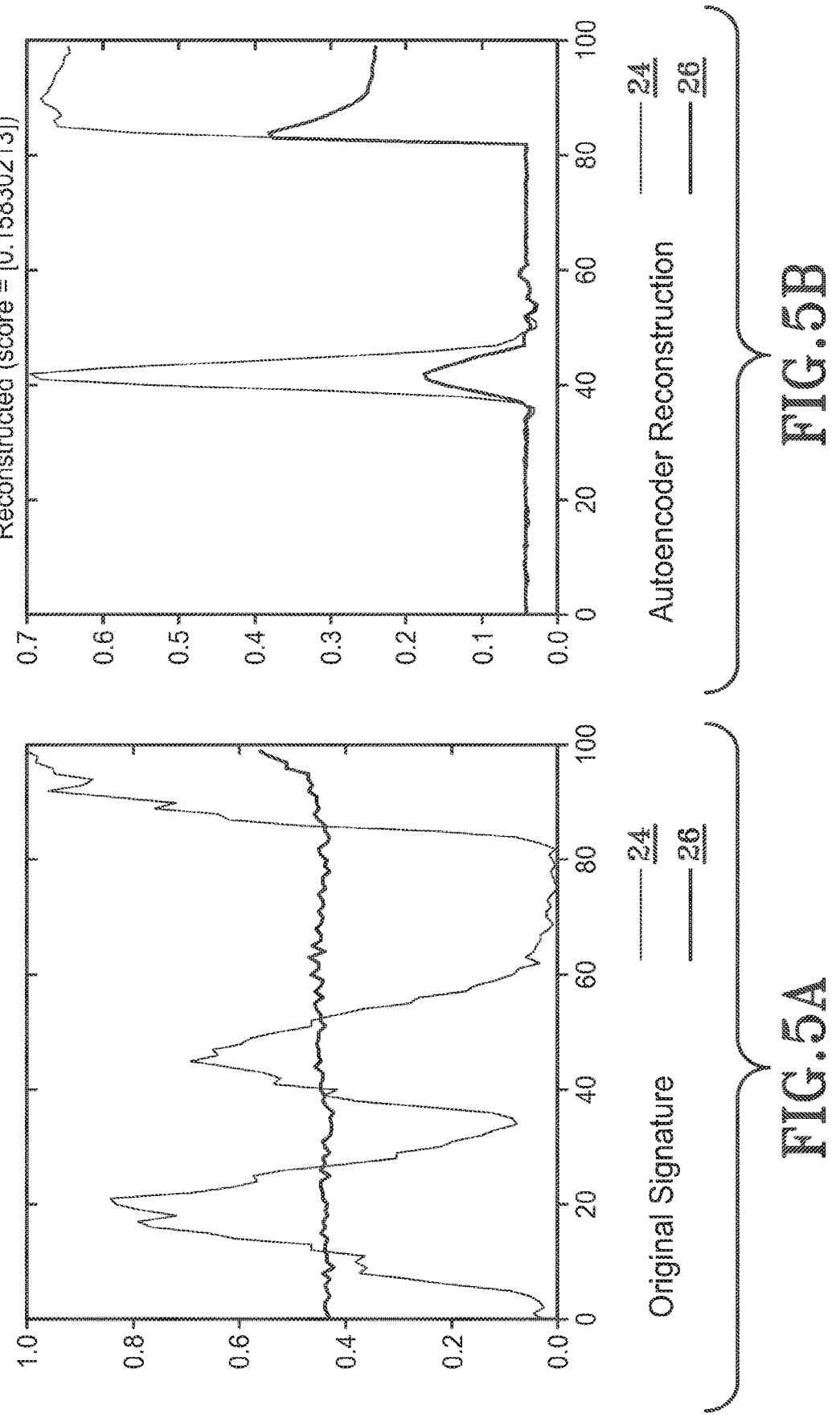
FIG. 5A (FIG. 5A) is a graph of an original signal signature input into the autoencoder.
FIG. 5B (FIG. 5B) is a graph of a reconstructed signal signature output from the autoencoder indicating a weak similarity score or metric as compared to the signal of FIG. 5B.

FIG. 4A, FIG. 4B, FIG. 5A, and FIG. 5B depict graphical representations of the operation of discriminator 10 after training has been complete. In operation, the scorer 14 identifies whether the original input signature or signal is a threat or a clutter. In some embodiments, the scorer may produce a binary output 0,1 wherein zero represents no threat and one represents a threat. However, in one particular embodiment, the scorer value is not binary, but rather is on a continuum of values. Typically, the similarity metric is normally in a range from zero to one, but it may also be outside this range. The scorer computes how similar it believes the reconstructed signal is with the input signal along the continuum. For example, FIG. 4A represents an original signature and FIG. 4B represents a reconstructed signal produced in autoencoder 12 subsequent to completing training. The scorer 14 identifies that the similarity score between the signal signature of FIG. 4A and the reconstructed signal signature of FIG. 4B is about 1. More particularly, the similarity metric is 1.01643729. Note: the score may be greater than 1 when an output activation function (soft max activation) is not used. Here, the score is computed using a regression function, not a classification function, hence the ability to have a similarity score greater than 1. It is advantageous to enable the similarity score to be any number (as opposed to a strict 0 or 1) because a threshold value can be implemented to determine whether the signal source is a threat (positive indicator) or a non-threat (negative indicator). FIG. 5A represent an original signature and FIG. 5B represents a reconstructed signal produced in autoencoder 12 subsequent to training. The scorer identifies that the similarity score between the signal signature of FIG. 5A and the reconstructed signal signature of FIG. 5B is about 0.2. More particularly, the similarity metric is 0.15830213.

The discriminator 10 has a threshold value to determine at what point something is going to be labeled a threat. In one embodiment, the threshold value is determined prior to the scorer comparing the signal signatures. In another embodiment, the threshold value may be dynamic and change as comparisons are implemented on a frame-by-frame basis. Threshold value is then set after training has been completed to determine at what point something may be labeled a threat. In one example, the threshold may be set at a value of 0.7. Thus, it the similarity metric is above 0.7, then the signal signature may be labeled a threat. If the similarity metric is below 0.7, then the original signature may be labeled as a nonthreat. Once the system has labeled an input signal or data signature as a threat, the discriminator 10 may provide the identified threat to another electrical device in operable communication with this discriminator 10. Some exemplary electrical devices in operable communication with this discriminator 10 include at least one non-transitory computer readable storage medium configured to store the threat signature. The stored threat identification may be provided to a countermeasure system so as to eliminate the threat. For example, if the threat is identified as a missile signature, the identified threat may be provided to a countermeasure system that can fire its own missile to neutralize or destroy the incoming threat. Alternatively, if the threat is an enemy-operated ground based radar station, the GPS or geolocation coordinates of the threat may be provided to an intelligence system so as to pass this information along so it may later be destroyed. In another particular example, the identification of the threat is provided to a different countermeasure process that determines how to adequate handle the identified threat. Notably, the operation and collection of the incoming data streams happens in real time while the training process happens in a lab.

With more particular reference to an exemplary operation of the scorer 14 (which may sometimes also be referred to as an analyzer), the input to the scorer 14 network is a pair of two-channel Intensity v Time signals (S, S') respectively fed along first channel 24 and second channel 16 that are 1 second in length each, 100 Hz (i.e. consists of 100 time points). The output of the scorer is a similarity metric, which may also be referred to as a distance metric or a threat score. This is a scalar value in the range (−∞, ∞) (i.e. the value is unbounded); however, values are typically in the range (−0.1, 1.1). Unnormalized inputs can cause values outside of this range. This 'normal' range is just a rough estimation based on empirical data. Each signal training pair (S,S') is labeled either 0 (if S does not represent a threat) or 1 (if S does represent a threat). This is a classic supervised learning problem. For the sake of the mathematical treatment, ANA (S,S') is the result of the analyzer network, and LBL(S,S') is the label for the training pair. An objective function for the scorer 14 is a weighted average of the mean squared error:

$$L = \frac{\left( a \sum_{(S,S') \in T} (ANA(S, S') - 1.0)^2 + b \sum_{(S,S') \in C} ANA(S, S')^2 \right)}{|T| + |C|}$$

In the objective function for the scorer detailed above, a is the threat score weight, T is the set of threat training samples, b is the clutter score weight, and C is the set of clutter training samples. In one particular embodiment an adaptive moment estimation optimizer (i.e., an Adam optimizer) implements this scorer 14 network. An exemplary Adam optimizer performs stochastic optimization that only requires first-order gradients with little memory requirement. The Adam optimizer computes individual adaptive learning rates for different parameters from estimates of first and second moments of the gradients. Some exemplary advantages of an Adam optimizer are that the magnitudes of parameter updates are invariant to rescaling of the gradient, its stepsizes are approximately bounded by the stepsize hyperparameter, it does not require a stationary objective, it works with sparse gradients, and it naturally performs a form of step size annealing.

Figure 6:
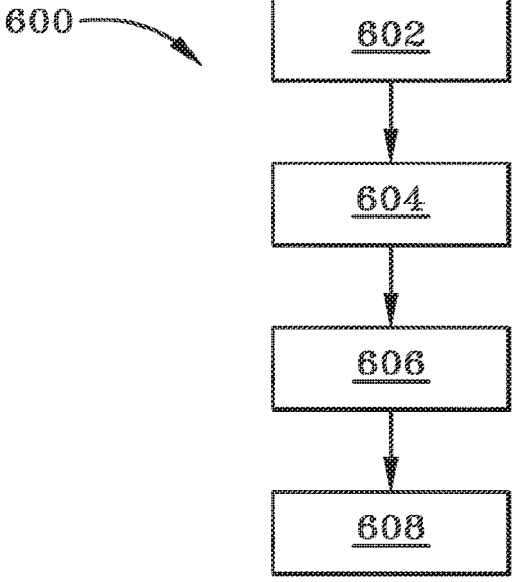
FIG. 6 (FIG. 6) is a flow chart depicting an exemplary method for the discriminator of the present disclosure.

FIG. 6 depicts an exemplary method for threat-agnostic neural network discrimination at 600. Method 600 may include reconstructing a signal from latent variables in the neural network autoencoder 12 to generate a reconstructed signal, which is shown generally at 602. Comparing an original signal with the reconstructed signal in the scorer 14 to generate a signal similarity metric between the original signature and the reconstructed signature is shown generally at 604. Determining an object type from the signal source based, at least in part, on whether the signal similarity score exceeds a threshold value is shown generally at 606. Recording the object type (such as a threat), at least temporarily, in a storage medium is shown generally at 608.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method for threat-agnostic neural network discrimination comprising:
generating, in a neural network autoencoder, a reconstructed signal from latent variables, wherein the number of latent variables are not fixed after the neural network autoencoder is trained;
comparing an original signal with the reconstructed signal in a scorer to generate a signal similarity metric between the original signal and the reconstructed signal; and
determining an object type from a signal source based, at least in part, on whether the signal similarity score exceeds a threshold value; and
recording the object type, at least temporarily, in a storage medium.

2. The method of claim 1, wherein exceeding the threshold value corresponds to a positive indicator and failing to meet the threshold value corresponds to a negative indicator.

3. The method of claim 2, wherein the positive indicator is a threat and the negative indicator is a non-threat.

4. The method of claim 1, further comprising:
identifying the object type from an open set of signal signatures representing random clutter.

5. The method of claim 1, further comprising:
identifying whether the original signal represents a threat or clutter;
generating a value in the scorer based on whether the original signal represents the threat or clutter.

6. The method of claim 5, wherein the value is binary.

7. The method of claim 5, wherein the value is any number along continuum of values from 0 to 1.

8. The method of claim 5, further comprising:
determining, in the scorer, a similarity score of the original signature to the reconstructed signature.

9. The method of claim 8, further comprising:
establishing a threshold value of the similarity score, wherein if the similarity score is above the threshold value, then the scorer determines that the original signature was generated from a source intended to be identified, and wherein if the similarity score is below the threshold value, then the scorer determines that the original signature was generated from a clutter source.

10. The method of claim 9, wherein the threshold value is static and established prior to determining the similarity score.

11. The method of claim 9, wherein the threshold value is dynamic and is changed in response to external variables.

12. The method of claim 9, further comprising:
determining a source type of the original signature based on the threshold value;
providing the source type to a secondary system; and
effecting the secondary system to eliminate the source of the original signature in response to providing the source type to the secondary system.

13. A method for a discriminator comprising:
inputting a first signal to a neural network autoencoder and a scorer;
compressing the first signal in the neural network autoencoder;
generating a set of latent variables in the neural network autoencoder, wherein the number of latent variables vary after the neural network autoencoder has been trained;
decoding the first signal from the set of latent variables to generate a reconstructed signal;
providing the reconstructed signal to the scorer; and
comparing, in the scorer, the reconstructed signal and the first signal.

14. The method of claim 13, further comprising:
training the neural network autoencoder with a set of clean signals free from clutter.

15. The method of claim 14, further comprising:
freezing the set of latent variables in the neural network autoencoder.

16. The method of claim 14, further comprising:
back propagating signals from the scorer to the neural network autoencoder.

* * * * *